N. W. HARTMAN.
TRACTOR DRIVING GEAR.
APPLICATION FILED MAR 15, 1920.
1,378,228.
Patented May 17, 1921.
2 SHEETS—SHEET 1.
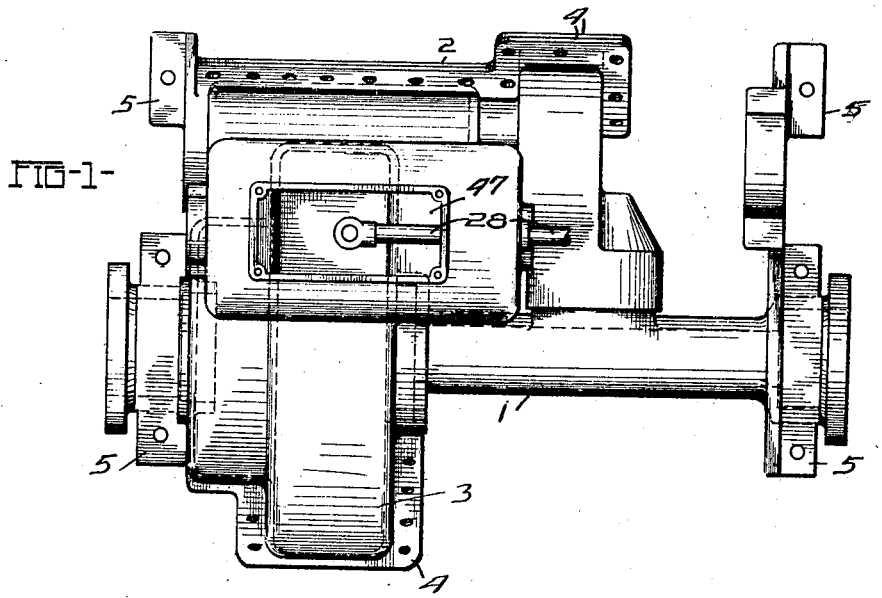
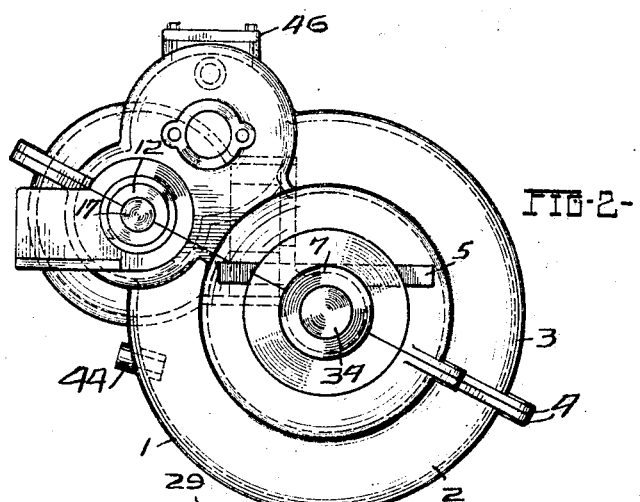
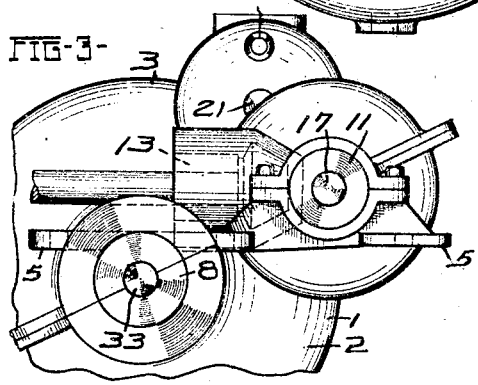
INVENTOR
Noble W. Hartman,
by
Owen, Owen + Crampton N. W. HARTMAN.
TRACTOR DRIVING GEAR.
APPLICATION FILED MAR 15, 1920.
1,378,228.
Patented May 17, 1921
2 SHEETS—SHEET 2.
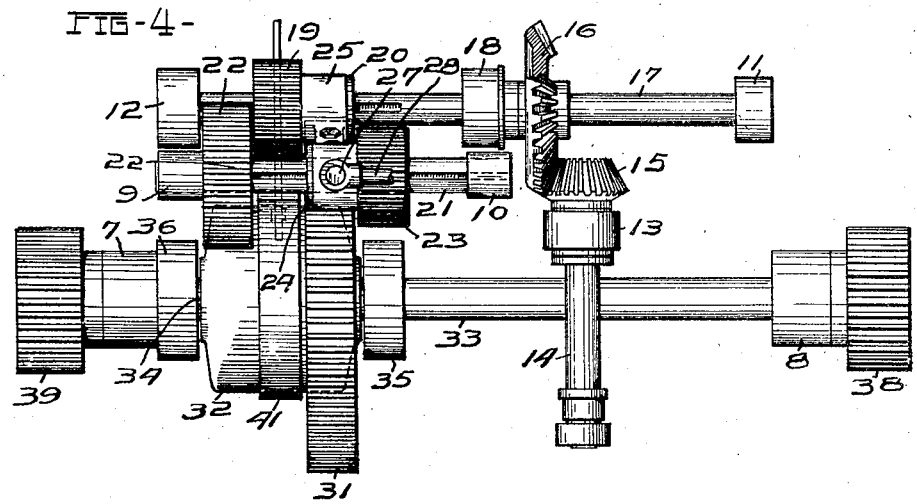
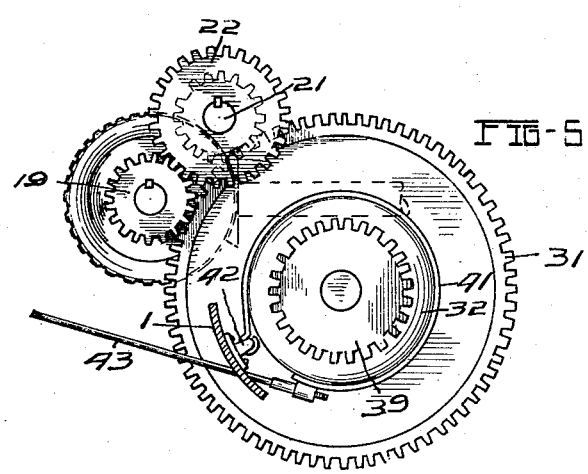
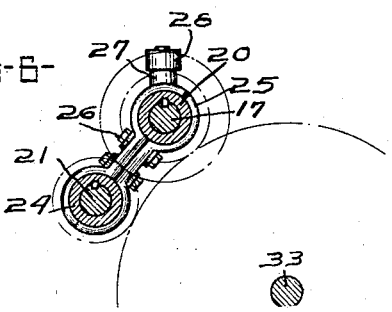
INVENTOR
Noble W. Hartman
by
Owen, Owen & Crampton

UNITED STATES PATENT OFFICE.

NOBLE W. HARTMAN, OF TOLEDO, OHIO, ASSIGNOR TO THE CONTINENTAL TRACTOR COMPANY, OF CONTINENTAL, OHIO, A CORPORATION OF OHIO.

TRACTOR DRIVING-GEAR.

1,378,228.  Specification of Letters Patent.  Patented May 17, 1921.

Application filed March 15, 1920. Serial No. 365,812.

*To all whom it may concern:*

Be it known that I, NOBLE W. HARTMAN, a citizen of the United States, and a resident of Toledo, in the county of Lucas and State of Ohio, have made an Invention Appertaining to Tractor Driving-Gear; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a driving gear for tractors and to produce in connection therewith a shell for containing the driving gear which will sustain and contain the driving gear in such a way that the parts of the gear are readily accessible for the purpose of assemblage and replacement or repair. The invention also has for its object to provide an efficient driving gear including mechanism for shifting parts of the gear to cause the tractor to be driven forward or to be driven backward and in this connection to provide means whereby parts of the gear may be readily shifted to make the proper mechanical connection for driving the tractor in the two directions. It also provides a means for braking the tractor by operating upon the differential forming a part of the driving gear involved in my invention. Other features and advantages of my invention will appear from the following description and upon examination of the drawings.

The invention may be contained in driving gears of different forms. To illustrate a practical application of the invention I have selected one of such constructions and shall describe it hereinafter. The construction selected is illustrated in the accompanying drawings.

Figure 1 of the drawings illustrates a top view of the casing. Fig. 2 illustrates a left end view of the casing shown in Fig. 1. Fig. 3 illustrates a right end view of the casing. Fig. 4 illustrates a top view of the gearing of the driving gear that is contained in the casing illustrated in Figs. 1, 2 and 3. Fig. 5 is a left end view of the gearing illustrated in Fig. 4. Fig. 6 illustrates a sectional view of part of the mechanism illustrated in Fig. 4.

1, in Figs. 1, 2 and 3, indicate parts of the casing for containing the driving gear for tractors. It is formed of two parts 2 and 3 which are bolted together by suitable bolts that pass through ears or flanges 4 formed at the edges of the two parts and which register. The casing is secured to the frame of the tractor by means of bolts that pass through the flanges 5.

The casing supports the shafts of the driving gear. The shafts are located in roller bearings 7, 8, 9, 10, 11, 12 and 13 which are suitably secured in the wall of the casing 1 and in which the shafts rotate. The shaft 14 is connected to the engine through a suitable clutch in the manner well known in the art. It is supported in the bearing 13 and within the upper portion 3 of the casing 1. A bevel gear wheel 15 is secured to the shaft 14 and this operates upon the bevel gear wheel 16 which is keyed to the shaft 17. The shaft 17 is supported in the bearings 11, 12 and 18. A gear wheel 19 having a sleeve 20 is slip keyed on the shaft 17 whereby the wheel 19 may be shifted along the shaft but the shaft 17 will cause rotation of the gear wheel 19. The shaft 21 which is supported in the roller bearings 9 and 10 is provided with a gear wheel 22 which is keyed to the shaft 21 and with which the gear wheel 19 will mesh when the gear wheel 19 is shifted into one position on the shaft 17. The shaft 21 is also provided with a gear wheel 23. The gear wheel 23 has a sleeve 24 connected therewith and the gear wheel 23 is slip keyed on a shaft 21 so as to permit the gear wheel 23 to be shifted along the shaft but which will cause rotative movements in the gear wheel 23 when the shaft 21 is rotated. The sleeves 20 and 24 are connected together by a split double collar 25, shown in Figs. 4 and 6. The parts of the double collar 25 are clamped about the sleeves 20 and 24 by means of the bolts 26 and thus the gears 19 and 23 are necessarily shifted together along the shafts 17 and 21. The double collar 25 is provided with a projecting pin 27 and a rod 28 is connected to the pin 27. A suitable device, such as a lever, located in proximity to the driver's seat may be connected to the rod 28 for shifting the gear wheels 19 and 23. The rod 28 passes through the opening 29 formed in the casing 1. Longitudinal movements of the rod produced by any suitable mechanism will cause the gears 19 and 23 to shift along the shafts 17 and 21.

When the gear wheel 19 is in position to mesh with the gear wheel 22, the gear wheel 23 will be in position to mesh with the gear wheel 31. The gear wheel 31 is keyed to the shell 32 containing a differential of any form but preferably a differential having spiral transmission gears. The differential shell 32 transmits by differential movement, in a manner well known in the art, its movement to the shafts 33 and 34. The shaft 33 is supported in bearings 8 and 35 located in the casing 1. The shaft 34 is supported in bearings 7 and 36 located in the casing 1. Gear wheels 38 and 39 are keyed to the shafts 33 and 34. The gears 38 and 39 mesh with the internal gear of the bull or driving wheels of the tractor. The transmission from the engine to the bull wheels being through the idler 22, the bull wheels are driven in a reverse direction, when the engine is connected through the clutch with the shaft 14. When the gear wheels 23 and 19 are shifted to the intermediate position, that is, the position shown in Fig. 4, disconnection is made between the bull wheels and the engine. When, however, the gear wheels 19 and 23 are shifted farther to the right the gear wheel 19 meshes with the gear wheel 31 while the gear wheel 23 remains idle. A direct connection is then made between the shafts 17 and 33 and the engine, when connected with the shaft 14 through the clutch, will drive the bull wheels forward.

In driving the bull wheels the shell 32 of the differential is rotated by the operation of the gear wheel 31 and also when the gear wheels 38 and 39 are rotated either by reason of momentum of the tractor or by reason of the tractor going down an incline. In order to reduce the movement of the tractor or to hold the tractor from movement, the casing is provided with a brake band 41 which surrounds the shell 32. One end of the brake band is connected by a bracket 42 to the shell 1 and the other end of the brake band 41 is adjustably connected to a rod 43. The rod 43 extends through a boss 44 formed in the shell 1. The brake rod 43 may be connected to a suitable device, such as a lever, for drawing the rod 43 which will cause the band 41 to frictionally engage with the differential shell 32 and reduce or prevent the rotation of the gear wheels 38 and 39 and thus movement of the tractor bull wheels is reduced or prevented.

The shell 1 is so divided into its parts 2 and 3 that the edges of the parts 2 and 3 that meet and are secured together by the bolts that pass through the flanges or ears 4 extend along a plane in which the axes of the shafts 17, 33 and 34 are located. The shaft 21 is located in the upper half or portion 3 of the casing 1. The top of the portion 3 is provided with a plate 46 which closes the opening 47 formed in the top of the casing. The gear wheels 22 and 23 are inserted through the opening 47 and then the shaft 21 is inserted through openings formed in the casing 1 and the bearing and the gear wheels 22 and 23. The double collar 25 is placed in the casing through the openings 47 and the halves of the collar are bolted together. The rod 28 is also connected to the collar.

In assembling the construction the shafts 17, 33 and 34 and the parts supported thereon are laid on the bottom portion 2 of the shell 1. The shaft 21 together with the parts connected therewith may be inserted in the portion 3 of the shell 1 and then the two portions 2 and 3 may be bolted together. The shaft 14 may then be connected to the engine. This provides a means for supporting a driving gear in such a way that the parts may be readily assembled and disassembled for the purpose of low cost of manufacture and for the purpose of replacement and repair.

I claim:

In a driving gear for tractors, a casing formed of two parts, a pair of shafts supported between the two parts, the said shafts having gear wheels, a third shaft having a pair of gear wheels and supported in one of the parts and so as to mesh with gear wheels of the first named shafts when the said parts are secured together, a split double collar for connecting gear wheels of one of the first named shafts and a gear wheel on the last named shaft, a rod extending through the casing for shifting the collar together with the gear wheels connected to the collar along their respective shafts.

In testimony whereof I have hereunto signed my name to this specification.

NOBLE W. HARTMAN.